W. W. BUNCE.
WEEDER ATTACHMENT FOR CULTIVATORS.
APPLICATION FILED MAR. 18, 1914.
1,163,586.
Patented Dec. 7, 1915.
2 SHEETS—SHEET 1.
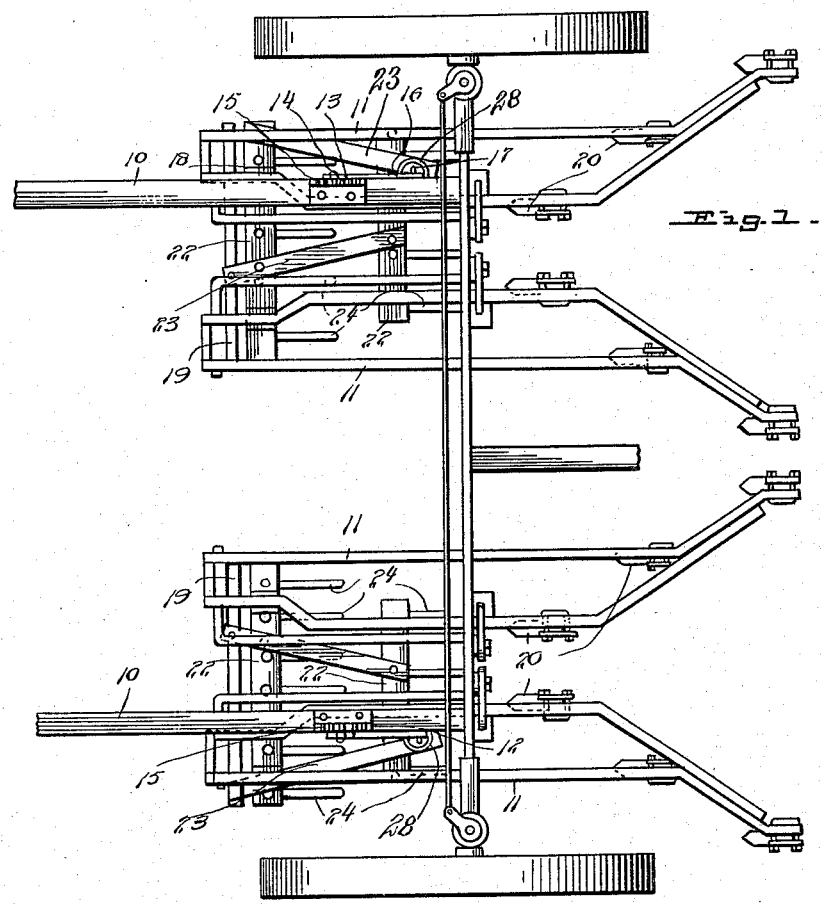
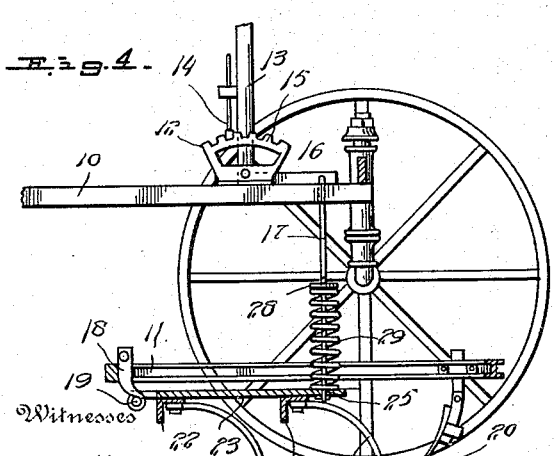
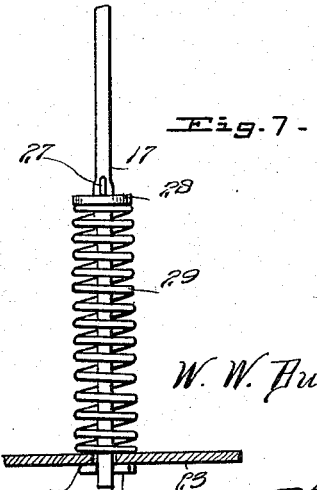

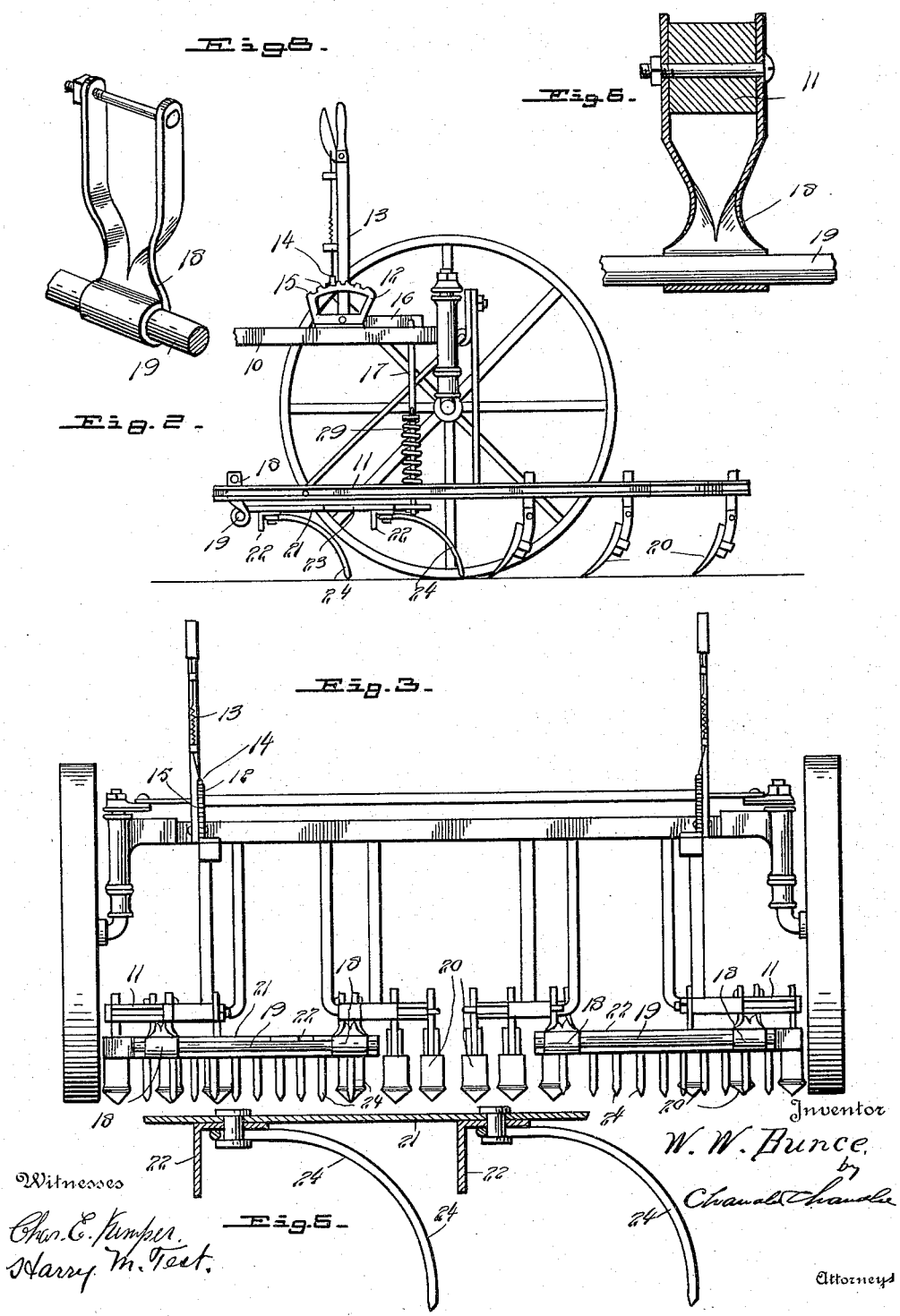

UNITED STATES PATENT OFFICE.

WESLEY W. BUNCE, OF ASHTON, SOUTH DAKOTA.

WEEDER ATTACHMENT FOR CULTIVATORS.

1,163,586.  Specification of Letters Patent.  Patented Dec. 7, 1915.

Application filed March 18, 1914. Serial No. 825,666.

*To all whom it may concern:*

Be it known that I, WESLEY W. BUNCE, a citizen of the United States, residing at Ashton, in the county of Spink, State of South Dakota, have invented certain new and useful Improvements in Weeder Attachments for Cultivators; and I do hereby declare the following to be a full, clear, and exact description of the invention, such as will enable others skilled in the art to which it appertains to make and use the same.

This invention relates to improvements in cultivator attachments, and particularly to weeding attachments for cultivators.

The principal object of the invention is to provide a simple and novel device of this character which can be quickly and easily attached to or detached from the ordinary straddle row cultivator.

Another object is to provide a weeding attachment for a straddle row cultivator which will be efficient in use and which can be quickly and easily moved into and out of operation from the driver's seat.

Other objects and advantages will be apparent from the following description, when taken in connection with the accompanying drawings.

In the drawings: Figure 1 is a top plan view of a portion of a cultivator, showing my invention applied thereto and in operative position. Fig. 2 is a side elevation of the same. Fig. 3 is a front elevation. Fig. 4 is a longitudinal sectional view showing the connection of the spring rod 17 with the bar 23. Fig. 5 is an enlarged fragmentary longitudinal sectional view on the line 5—5 of Fig. 1. Fig. 6 is an enlarged sectional detail view of the clip of Fig. 8. Fig. 7 is a detail view of the spring 29 and connections thereof; Fig. 8 is a perspective view of the clip 18.

Referring particularly to the accompanying drawings, 10 represents the draft poles or tongues of the cultivator, and 11 the beams of the cultivator frame. Mounted on the pole is a toothed segment 12, and pivotally mounted on this segment is a hand lever 13 provided with a pawl 14 for engagement with the teeth 15 of the segment. This lever has a rearwardly extending arm 16 to which is pivotally connected a depending link or rod 17.

Secured to the beams 11 by means of the clips 18 is an oscillating shaft 19 which is disposed transversely of the cultivator, and between the forward ends of the gangs of shovels 20. Secured to the shaft and extending rearwardly therefrom are the frame bars 21, and secured to these bars are the transversely arranged angle bars 22. These angle bars 22 are further secured together by the bars 23. Carried by each of the angle bars 22 are the rearwardly extending curved rake teeth 24, the teeth of one bar being arranged in staggered relation to the teeth of the other bar. The bar 23 extends to a suitable distance beyond the rear angle bar 22, and is provided with a vertical opening 25 through which passes the lower end of the beforementioned rod or link 17. A pin 26 is passed through the lower end of the link 17 below the bar 23. At a point approximately midway of the length of the link 17, a pin 27 is passed therethrough, and on the link below this pin is a suitable washer plate 28. Encircling the rod or link between the washer plate and the bar 23 is a coiled spring 29. When the lever 13 is pulled rearwardly the link 17 will move down and swing the weeder frame down into operative position. The spring 29 will yieldably hold the weeder frame in ground engaging position, and should the frame strike an obstruction such as a stone, the frame would readily rise against the tension of the spring, but be immediately forced down thereby after the obstruction was passed. By swinging the lever forwardly, the arms 16 will pull up on the link 17 and raise the weeder frame out of engagement with the ground.

This weeder attachment is particularly adapted for use in connection with straddle row cultivators and is placed directly in front of and between the gangs of cultivator shovels so that the weeds can be cleared from between the rows in advance of the shovels, thus making it easier for the shovels to loosen the soil at the sides of the plants. The device is simple in construction, and comparatively light so that the draft of the cultivator will not be materially increased, nor is there any danger of the weeder digging up or otherwise injuring the plants.

I do not limit my invention to the exact details of construction, combination and arrangement of parts, as herewith illustrated and described, but my invention may only be limited by a reasonable interpretation of the claims.

What is claimed is:

1. In a weeder attachment for a cultivator, a pivoted frame carried by the beams of the cultivator between the gangs of shovels, weeder teeth carried by the frame, means for raising and lowering the frame on its pivot, and means carried by the raising and lowering means and engaging the pivoted frame for pressing the weeder attachment downwardly into resilient engagement with the ground.

2. A weeder attachment for a straddle row cultivator comprising a frame detachably pivoted on the cultivator beams and disposed in advance of and between the gangs of cultivator shovels, weeder teeth carried by the frame, a lever mounted on the cultivator, a link pivotally connected to the lever and to the frame, and resilient means on the link for holding the said frame yieldably in engagement with the ground.

In testimony whereof, I affix my signature, in the presence of two witnesses.

WESLEY W. BUNCE.

Witnesses:
W. E. COLE,
H. M. WILSON.

Copies of this patent may be obtained for five cents each, by addressing the "Commissioner of Patents, Washington, D. C."